United States Patent
Raju et al.

(10) Patent No.: US 9,131,006 B2
(45) Date of Patent: *Sep. 8, 2015

(54) METHOD AND SYSTEM FOR EXTENDING SERVICES TO CELLULAR DEVICES

(75) Inventors: Vishwanath Raju, Ottawa (CA); Alain Mouttham, Ottawa (CA)

(73) Assignee: CounterPath Technologies Inc., Vancouver, British Columbia (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/406,790

(22) Filed: Feb. 28, 2012

(65) Prior Publication Data
US 2012/0157059 A1    Jun. 21, 2012

Related U.S. Application Data

(63) Continuation of application No. 11/755,492, filed on May 30, 2007, now Pat. No. 8,165,576, which is a continuation-in-part of application No. 11/422,173, filed on Jun. 5, 2006, now abandoned.

(51) Int. Cl.
*H04W 40/00* (2009.01)
*H04L 29/08* (2006.01)
(Continued)

(52) U.S. Cl.
CPC .......... *H04L 67/2823* (2013.01); *H04L 65/103* (2013.01); *H04L 65/105* (2013.01); *H04L 65/1006* (2013.01); *H04L 65/1026* (2013.01); *H04L 67/04* (2013.01); *H04L 67/28* (2013.01); *H04M 3/42314* (2013.01); *H04W 36/0027* (2013.01); *H04W 76/041* (2013.01);
(Continued)

(58) Field of Classification Search
CPC ..... H04L 67/28; H04L 67/2823; H04L 67/04; H04W 36/0027
USPC ............................... 455/422.1, 445
See application file for complete search history.

(56) References Cited

U.S. PATENT DOCUMENTS 6,987,985 B2  1/2006  Purkayastha et al.
7,068,622 B2  6/2006  Jagadeesan et al.
(Continued)

FOREIGN PATENT DOCUMENTS

DE    102004030290    1/2006
EP    1492303    12/2004

OTHER PUBLICATIONS

U.S. Appl. No. 11/755,492, Notice of Allowance dated Feb. 10, 2012.
(Continued)

*Primary Examiner* — Shahriar Behnamian
(74) *Attorney, Agent, or Firm* — Louis B. Allard; Borden Ladner Gervais LLP (57) ABSTRACT

A system and method is provided for extending services to cellular devices. The system includes a wireless gateway having a client side with an intelligent client agent and a server side with an intelligent server agent, a wireless device having a first mode operable in a cellular system and a second mode operable in a wireless local area network and including an intelligent client agent for determining operation mode and for communicating with the intelligent client agent of the wireless gateway and a communications protocol for communication between the wireless gateway intelligent client agent and the wireless device intelligent client agent to effect services. The services include one or more of voice, directory, presence, and media services.

12 Claims, 9 Drawing Sheets

(51) Int. Cl.
    *H04L 29/06*     (2006.01)
    *H04M 3/42*     (2006.01)
    *H04W 36/00*     (2009.01)
    *H04W 76/04*     (2009.01)
    *H04W 88/06*     (2009.01)
    *H04W 88/16*     (2009.01)
    *H04W 92/02*     (2009.01)

(52) U.S. Cl.
    CPC .............. *H04W 88/06* (2013.01); *H04W 88/16* (2013.01); *H04W 92/02* (2013.01)

(56) References Cited

U.S. PATENT DOCUMENTS

| | | | |
|---|---|---|---|
| 7,076,251 B2 | 7/2006 | Jagadeesan et al. | |
| 7,245,917 B2 * | 7/2007 | Chiueh | 455/442 |
| 7,539,494 B2 * | 5/2009 | Idnani et al. | 455/445 |
| 2002/0132638 A1 | 9/2002 | Plahte et al. | |
| 2002/0187777 A1 * | 12/2002 | Osterhout et al. | 455/417 |
| 2003/0027595 A1 * | 2/2003 | Ejzak | 455/560 |
| 2004/0248615 A1 | 12/2004 | Purkayastha et al. | |
| 2005/0063359 A1 | 3/2005 | Jagadeesan et al. | |
| 2005/0259679 A1 | 11/2005 | Chowdhury et al. | |
| 2006/0116127 A1 | 6/2006 | Wilhoite et al. | |
| 2007/0070980 A1 * | 3/2007 | Phelps et al. | 370/352 |

OTHER PUBLICATIONS

European Patent Application No. 07719871.1, European Search Report dated Apr. 14, 2015.

* cited by examiner

Dual mode mobile device operating in WiFi mode

Incoming call request
Figure 7

Accept message and SIP redirect
Figure 8

METHOD AND SYSTEM FOR EXTENDING SERVICES TO CELLULAR DEVICES

CROSS-REFERENCE TO RELATED APPLICATIONS

This application is a continuation of U.S. patent application Ser. No. 11/755,492, filed May 30, 2007, which is continuation-in-part of U.S. patent application Ser. No. 11/422,173, filed Jun. 5, 2006, both of which are incorporated herein by reference in their entirety.

FIELD OF THE INVENTION

The present invention relates to communication between a dual mode mobile device operable over WiFi and cellular networks, and a session initiation protocol (SIP)-enabled network. More particularly, the present invention relates to enabling SIP functionality of a dual mode mobile device through a cellular network when the mobile device loses access to a WiFi network.

BACKGROUND OF THE INVENTION

In order to contain costs and extend functionality, enterprises are eager to adopt Voice over IP (VoIP) and other Internet Protocol (IP)-based communication services. To address this need, developers of Private Branch Exchange (PBX) equipment and software have developed IP PBXs to provide the functionality users expect in conventional PBXs, such as conference calling, call forwarding, automatic call distribution, shared message boxes, etc., and to provide new functionality that takes advantage of the multimedia content that can be transmitted over the Internet.

Session Initiation Protocol (SIP), specified in the RFC 3261 of the Internet Engineering Task Force (IETF) SIP Working Group, is an application-layer control (signaling) protocol for creating, modifying, and terminating sessions with one or more participants, and is widely used as a signaling protocol for VoIP. SIP sessions can be of different media types, including Internet Protocol (IP) telephone calls, instant messaging (IM), multimedia distribution, and multimedia conferences. SIP provides a signaling and call setup protocol for IP-based communications that can support many of the call processing functions and features present in the public switched telephone network (PSTN). SIP itself does not define these features. However, SIP permits such features to be built into network elements, such as proxy servers and user agents, and implementing these features permits familiar telephone-like operations, such as dialing a number, causing a phone to ring, and hearing ringback tones or a busy signal.

SIP works in concert with several other protocols and is only involved in the signaling portion of a communication session. SIP acts as a carrier for the Session Description Protocol (SDP), which describes the set up and media content of the session, such as the IP ports to use and the codec being used. SIP clients typically use Transmission Control Protocol (TCP) and User Datagram Protocol (UDP) to connect to SIP servers and other SIP endpoints. SIP is most commonly used to set up and tear down voice and video calls. However, it can be used in any application where session management is a requirement, such as event subscription and notification, and terminal mobility. All communications are done over separate session protocols, typically implementing Real-Time Transport Protocol (RTP).

SIP-enabled telephony networks can also implement many of the more advanced call processing features present in Signaling System 7 (SS7). However, while SS7 is a highly centralized protocol, characterized by complex central network architecture and unintelligent endpoints (conventional telephone handsets), SIP is a peer-to-peer protocol. SIP features are typically implemented in the communicating endpoints (i.e. at the edge of the network) as opposed to traditional SS7 features, which are implemented in the network.

Enterprises, and their employees, increasingly rely on mobile communication devices, such as cellular telephones and wireless messaging devices, to carry out day-to-day business. Currently, WiFi and dual mode mobile devices can access SIP-enabled call processing functions of their related enterprise, but only when the mobile device in question is within range of the related enterprise WiFi network. When the user of a dual mode mobile device roams out of WiFi range of the enterprise network, he is left with cellular communication only. Thus, mobile device users out of their enterprise WiFi range do not have access to the rich IP-enabled features and services, nor do they, typically, have access to the features and services offered by the PBX associated with their enterprise.

It is, therefore, desirable to provide a method and system that provides SIP-enabled call processing functions to mobile devices operating in a cellular network.

SUMMARY OF THE INVENTION

It is an object of the present invention to obviate or mitigate at least one disadvantage of previous mobile devices having access to SIP-enabled services only when within range of their related enterprise system.

In a first aspect, there is provided a wireless communication gateway for a Session Initiation Protocol (SIP) enterprise system. The wireless communication gateway comprises: at least one processor; and a memory operatively coupled to the processor, the memory storing instructions that when executed by the processor provide an intelligent server agent. The intelligent server agent has: an input/output adapter for communicating with an intelligent client agent in a mobile device over a cellular network using an HTML-based protocol; and a session manager, connected to the input/output adapter, for instantiating a SIP proxy user agent or a back to back user agent (B2BUA) in response to a request for a cellular connection received from the intelligent client agent of the mobile device over the cellular network, the request for the cellular connection being made using the HTML-based protocol.

In a second aspect, there is provided a method of establishing communication between a caller using a SIP for calling a mobile device operating over a cell network. The method comprises steps of receiving a call request for the mobile device at a wireless communication gateway and transferring the call request to the mobile device over the Internet and the cell network. The method also comprises steps of transmitting an accept call message from the mobile device to the wireless communication gateway over the Internet and the cell network and redirecting the call request from the gateway to the mobile device through the public switch telephone network (PSTN) in accordance with the accept call message.

In a third aspect, there is provided a method of establishing Session Initiation Protocol (SIP) communication between a caller connected to an enterprise system and a mobile device connected to the enterprise system through a cell network. The method comprising steps of receiving a call request for the mobile device at a B2BUA registered with an enterprise public branch exchange (PBX) of the enterprise system and transferring the call request to the mobile device over the Internet and the cell network. The method also comprises steps of transmitting an accept call message from the mobile device to the B2BUA and establishing a call between the B2BUA and the caller through the PBX.

In a fourth aspect, there is provided a method for maintaining Session Initiation Protocol (SIP) communication between a mobile device and an enterprise system, the SIP communication enabled by a WiFi signal, the enterprise system connected to a public switched telephone network (PSTN), the enterprise system having a wireless communication gateway. The method comprises steps of: at the mobile device, detecting a weakening of the WiFi signal; and sending a HTML-based protocol message to the communication gateway, the HTML-based protocol message indicating the weakening of the WiFi signal. At the wireless communication gateway, upon receipt of the HTML-based protocol message from the mobile device, instantiating a back to back user agent; and placing a call to the mobile device through the PSTN using the B2BUA. And, at the mobile device, receiving the call; and answering the call through the PSTN.

In a fifth aspect, there is provided A method for maintaining Session Initiation Protocol (SIP) communication between a mobile device and an enterprise system, the SIP communication enabled by a cell signal, the enterprise system having a wireless communication gateway and a WiFi network. The method comprises steps of: at the mobile device, detecting a weakening of the cell signal; and sending a HTML-based protocol message to the communication gateway, the HTML-based protocol message indicating the weakening of the cell signal. At the wireless communication gateway, upon receipt of the HTML-based protocol message from the mobile device, placing a call to the mobile device through the WiFi network. And, at the mobile device, receiving the call; and answering the call through the WiFi network.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention is to a method and system for providing SIP-enabled calling functions to mobile devices operating outside WiFi range of their related enterprise WiFi base station. The invention provides SIP-enabled calling functions to a mobile device through a cell network using an enterprise wireless communication gateway. The gateway includes a SIP proxy user agent and/or B2BUA to represent the mobile device to the SIP network of the enterprise in question. This allows an enterprise worker to maintain or to gain access to SIP-enabled calling functions when outside of the enterprise's WiFi network.

Figure 1:
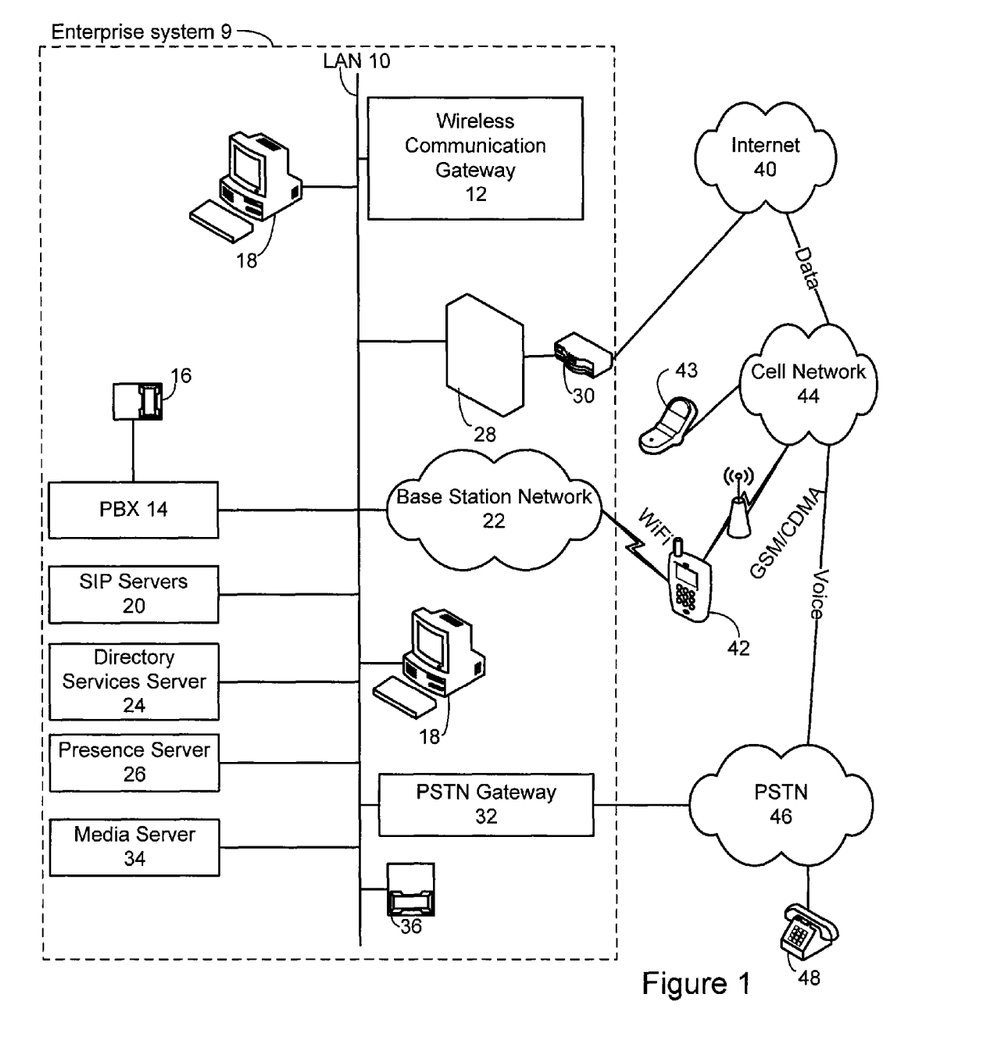
FIG. 1 shows an exemplary system architecture according to an embodiment of the present invention.

Referring to FIG. 1, the architecture of a SIP enterprise system 9 according to an embodiment of the present invention is shown with connections to public networks. The system architecture is intended to be exemplary only, and the actual system architecture will depend on the services and functionality desired by the enterprise. Typically, the system hardware will be housed in a single building, but distributed architectures are equally contemplated and encompassed by the present invention. The illustrated enterprise hardware comprises a Local Area Network (LAN) 10 to which is connected a wireless communication gateway 12, an Internet Protocol Private Branch Exchange (IP PBX) 14, telephones 16, workstations 18 which may optionally be running SIP softphones, SIP servers 20, a base station network 22, a directory services server 24, a presence server 26, a firewall 28 and router 30, a Public Switched Telephone Network (PSTN) gateway 32, a media server 34, and SIP telephones 36. While shown as separate and distinct devices, the various components of the enterprise system can be integrated in many ways, as is well known in the art. For example two or more of the server functions can be integrated into a single device, or can be integrated into the PBX 14.

The PBX 14 is connected to the SIP servers 20 over the LAN 10, and communicates with the SIP servers 20 using SIP. SIP servers are proxy servers that route requests to the user's current location, authenticate and authorize users for services, implement provider call-routing policies, and provide features to users. SIP also provides a registration function that allows users to upload their current locations for use by proxy servers. The PBX 14 is connected to telephones 16 via conventional circuit-switched connections. The PBX 14 can be connected to the PSTN 46 via the PSTN gateway 32 as shown, or it can be directly connected. The SIP servers 20 are connected to the SIP telephones 36 and the PSTN gateway 32 via the LAN 10. The PSTN gateway 32 translates SIP into various PSTN protocols, as is well known.

The wireless communication gateway 12 communicates with the SIP servers 20 using SIP via the LAN 10. The wireless communication gateway 12 is also connected to the Internet 40 through the LAN 10 and the firewall/router 28/30. As will be discussed below, cellular communications with SIP-enabled call processing functions are routed through the wireless communication gateway 12.

The directory services server 24, presence server 26 and media server 34 are all accessible to the wireless communication gateway 12 via the LAN 10. The directory services server 24 can, for example, use Lightweight Directory Access Protocol (LDAP) to communicate with the wireless communication gateway 12. The presence server 26 can, for example, use SIP Instant Messaging and Presence Leveraging Extensions (SIMPLE) to communicate with the wireless communication gateway 12. SIMPLE can carry presence information, conveying a user's willingness and ability to engage in communications. The media server 34 can, for example, use SIP to communicate, and is connected to the PSTN gateway 32, the wireless communication gateway 12 and SIP servers 20 via the LAN 10. The media server 34 provides interactive voice response (IVR) and conferencing functionality. Media servers, or gateways, typically offer conferencing functionality, play and record functionality, speech recognition, and text-to-speech translation. The play function involves playing to a user, or to a conference, a previously recorded message. The record function involves recording messages, calls or conferences. The speech recognition function involves comparing a user's utterance to a recorded signal. The text-to-speech function involves converting written words to speech and playing them to a user or a conference. Other features can include, for example, hold, cancel, call transfer and hold.

Wireless mobile communication devices, such as 2.5G cellular devices, WiFi devices and dual mode GSM and CDMA devices can connect to the enterprise system. Dual mode devices, such as illustrated dual mode device 42, provide dual-mode connectivity to both the base station network 22 via WiFi, and the cell phone network 44 via GSM or CDMA. The cell network 44 connects to the PSTN 46 and the Internet 40. Voice calls from the dual mode device 42, or other cellular devices 43, can travel from the cell network to the PSTN via trunk or digital lines, and data packets can travel from the cell network to the Internet. WiFi devices in range can communicate directly with base station network 22. External voice telephones 48 can also connect to the PSTN 46 via trunk or digital lines, and hence to the enterprise system.

As shown in FIG. 1, the system has access to both data and voice networks. The data network can include one or more LANs connected to a Wide Area Network (WAN). The voice network can communicate over both traditional circuit switched nodes and Voice Over IP (VOIP) nodes, which utilize the data network. The voice network can span both the enterprise domain and the public domain. Devices and boxes connected to the data network, such as phones, servers, gateways, base stations, desktops, and VOIP devices, typically store a unique network address, such as an IP address, in memory. Data packets can be routed to the device at the stored address. Devices connected to the circuit switched voice network use standard telephony addressing, such as telephone numbers or extensions. They are connected with standard interfaces, such as T1 trunks and digital lines.

In the following, expressions relating to "intelligent agents" or "agents" will be used. These expressions are well known in the art of computer science. An agent is a complex software entity that is capable of acting with a certain degree of autonomy in order to accomplish tasks on behalf of its user. An agent is essentially a software entity defined in terms of its behavior. An agent's behaviour can be defined in terms of such concepts as: persistence (code is not executed on demand but runs continuously and decides for itself when it should perform some activity); autonomy (agents have capabilities of task selection, prioritization, goal-directed behavior, decision-making without human intervention); social ability (agents are able to engage other components through some sort of communication and coordination, they may collaborate on a task); and, reactivity (agents perceive the context in which they operate and react to it appropriately). As used herein, agents and other software-enabled functional blocks are executed on a suitable general purpose computer, server, or other device having a microprocessor running on known operating systems such as, for example, Linux or Windows, and have access to memory and data through any suitable means.

Intelligent agents have the ability to adapt and to learn. Adaptation implies sensing the environment and reconfiguring in response. This can be achieved through the choice of alternative problem solving rules or algorithms, or through the discovery of problem solving strategies. Adaptation may also include other aspects of an agent's internal construction, such as recruiting processor or storage resources. Learning, on the other hand, may proceed through trial-and-error. This implies a capability of introspection and analysis of behavior and success. Alternatively, learning may proceed by example and generalization, which implies a capacity to abstract and generalize.

Figure 2:
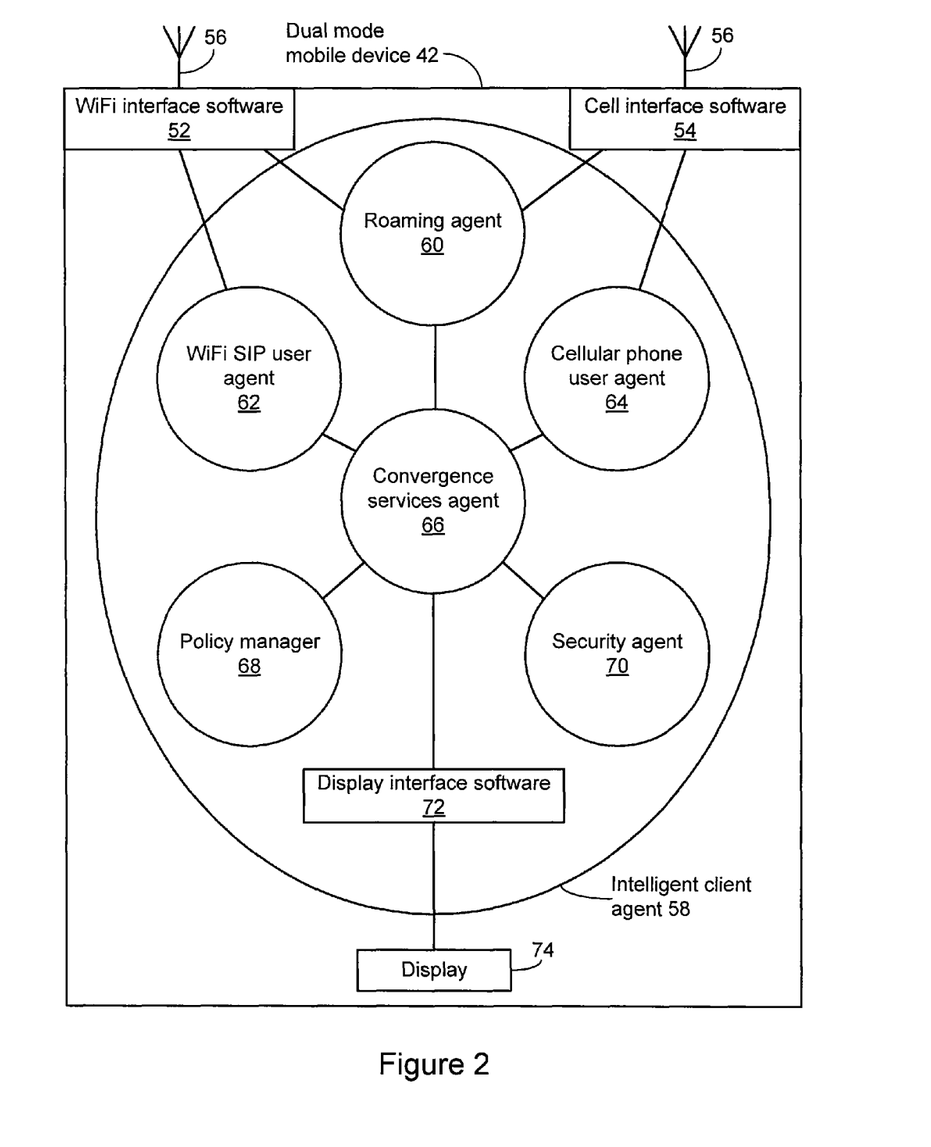
FIG. 2 is a block diagram of a dual mode mobile device according to an embodiment of the present invention.

Referring to FIG. 2, according to an embodiment of the present invention, a block diagram of a dual mode mobile device 42 is shown. The mobile device 42 has a WiFi interface 52 and a cell interface 54, each respectively connected to an antenna 56. The dual mode mobile device 42 also has an intelligent client agent 58, which includes a roaming agent 60, a WiFi SIP user agent 62, a cellular phone user agent 64, a convergence services agent 66, a policy manager 68, a security agent 70 and a display interface 72 connected to a display 74. The intelligent client agent 58 can manage the interaction of the dual mode mobile device 42 with the wireless communication gateway 12; the consistency of the display 74 regardless of the mode in which the dual mode mobile device 42 is active; the interaction of the dual mode mobile device 42 with the SIP servers 20, shown in FIG. 1, when the mobile device is in WiFi mode; and security of the mobile device 42.

The roaming agent 60 monitors both the WiFi interface 52 and the cell interface 54 to determine which mode the dual mode mobile device 42 is using and which modes are available for use by the mobile device. Upon that determination, the roaming agent 60 communicates with the convergence services agent 66, which in turn enables either the WiFi SIP user agent 62 or the cellular phone user agent 64. The convergence services agent 66 can also use policies from the policy manager 68 to determine which mode is applicable. The convergence services agent 66 is also responsible for interacting with the display 74 of the device, through the display interface software, and for ensuring that correct options (also based on policy) are presented to the user in a uniform way regardless of function or mode of the mobile device 42. In certain circumstances, the convergence services agent 66 can use the security agent 70 to encrypt/decrypt messages, collect personal identification numbers (PINs) and passwords, and invoke a 'kill' command to cause the mobile device 42 to be unusable, and the data on it inaccessible.

Figure 3:
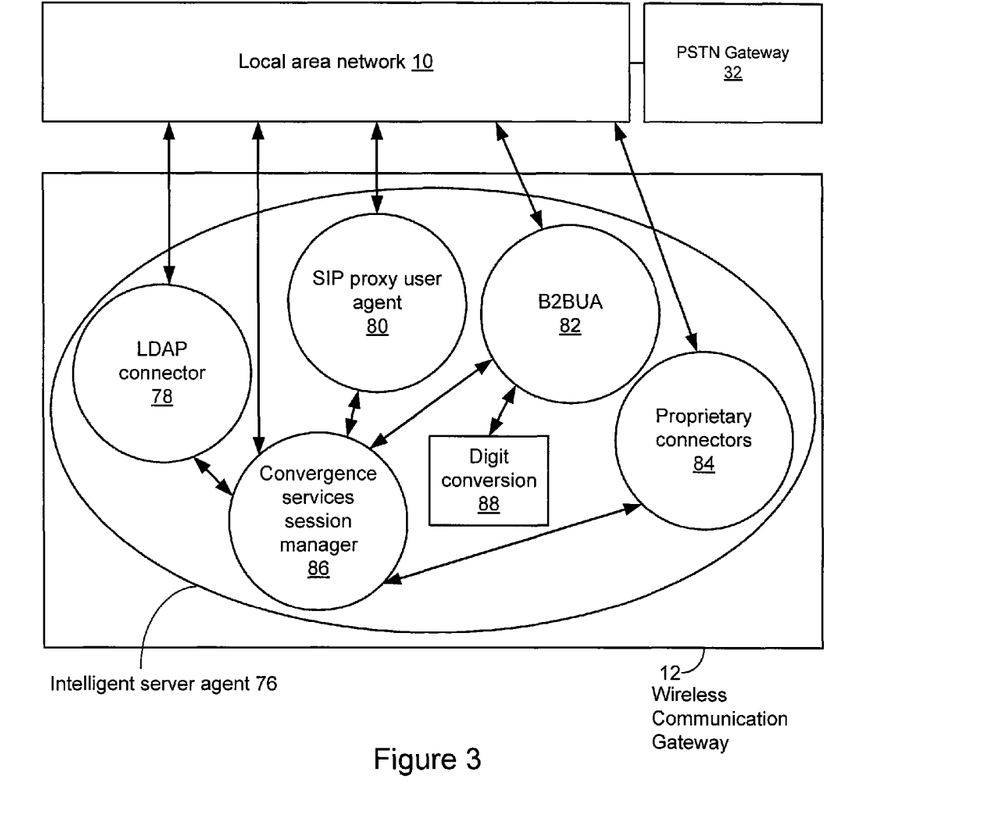
FIG. 3 is a block diagram of a wireless communication gateway according to an embodiment of the present invention.

FIG. 3 is a block diagram of the functional modules within the wireless communication gateway 12, with connection to the LAN 10. The gateway 12 includes an intelligent server agent 76 that manages the interaction of the dual mode mobile device 42 with the SIP servers 20 when the mobile device 42 is in cell mode. The intelligent server agent 76 also conveys information to and from the directory services 24 and the mobile device 42, and conveys information to and from any supplementary services and the mobile device 42. When the mobile device 42 is in WiFi mode and within WiFi range of the base station network 22, it uses it own WiFi SIP user agent 62 to communicate with the enterprise system 9.

The intelligent server agent 76 includes an LDAP connector 78 that interfaces with the directory services 24 and a SIP proxy user agent 80 that acts as a proxy for the mobile device 42 when the mobile device 42 is in cell mode. The intelligent server agent 76 can also include a B2BUA 82 that can act as a proxy for the mobile device 42 when the mobile device 42 is in cell mode. B2BUAs are known in the art and are responsible for handling SIP signalling between both ends of a call, from call establishment to termination. Each call is tracked from beginning to end, allowing the operators of the B2BUA to offer value-added features to the call. Further, the intelligent server agent 76 can include proprietary connectors 84 for interacting with supplementary services (not shown).

The LDAP connector 78, the SIP proxy user agent 80, the B2BUA 82 and the proprietary connectors 84 are all connected to a convergence services session manager 86 that sends and receives messages, using a convergence protocol, to an from the convergence services agent 66 of the mobile device 42 over the Internet 40 and the cell network 44. The convergence protocol is an HTML-based protocol, that reduces the messaging required between the convergence services session manager 86 and any connected client device. In a present embodiment, the client device sends periodic HTML_GET messages to the convergence services session manager 86. If an event directed to the client device, such as an incoming call, an IM request or the detection of a desired presence, is received during a given period, the convergence services session manager 86 sends an HTML_OK message, with the event information, to the client device. If no event is detected during a given period, the convergence services session manager returns an empty HTML_OK message to the client device at the expiry of the period.

The convergence protocol encapsulates SIP services, directory services and mobility services that would normally be part of the SIP and LDAP protocols. These are adapted into a package to address security, and device mobility, including changes in IP address, firewall and bandwidth issues to do with the cell network 44. The convergence protocol can easily be extended to allow additional functionality such as: allowing for the wiping of all sensitive data from the device in the event of loss or theft; allowing for persistent session maintenance during periods of signal loss (e.g. during flights etc); allowing an enterprise user to retrieve all event data upon reconnection (missed calls etc); and allowing tracking of GPS data on the device for enterprise location services. In the GPS example, the convergence protocol would be used to send a location message to the server, which would have an application installed thereon to interpret and use this location information.

The convergence services session manager 86 communicates back and forth with the SIP proxy user agent 80 and/or the B2BUA 82 for SIP service requests/responses, translating to and from the convergence protocol. The convergence services session manager 86 also communicates with the LDAP connector 78 for directory services requests/responses translating to and from the convergence protocol. The convergence services session manager 86 can also communicate back and forth with the proprietary connectors for proprietary requests/responses, translating to and from the convergence protocol. Thus, the convergence services session manager 86 is responsible for sending and receiving convergence protocol messages to and from the convergence services agent 66. The convergence services session manager 86 is also responsible for translating from the convergence protocol to protocols related to the LDAP connector 78, the SIP proxy user agent 80, the B2BUA 82 and the proprietary connectors 84, and vice versa.

Additionally, the convergence services session manager 86 manages the various sessions between all the mobile devices 42 and 43 shown in FIG. 1, and the actual need for a SIP proxy user agent 80 or a B2BUA 82 for mobiles devices operating in cell mode. Further, the convergence services session manager 86 manages policies related to users of the mobiles devices 42 and 43, maintains data connections to mobile devices alive, and manages security matters.

Figure 4:
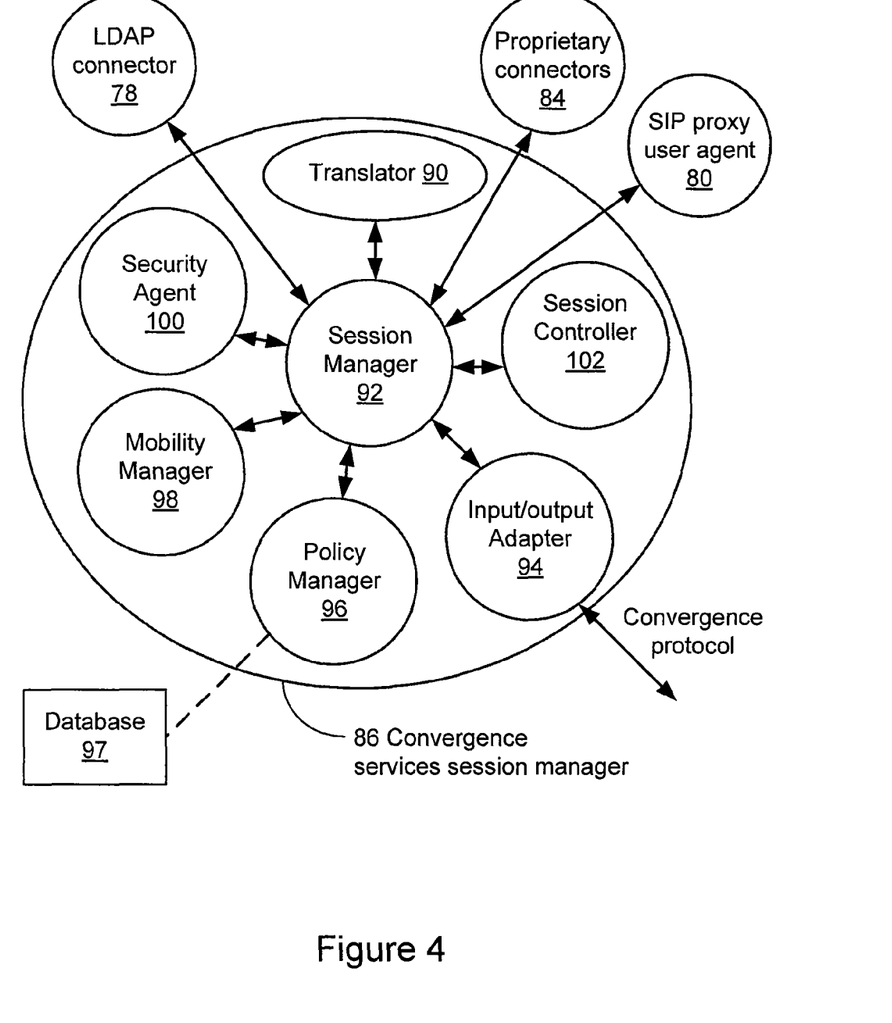
FIG. 4 is a block diagram of a convergence services session manager according to an embodiment of the present invention.

Referring to FIG. 4, according to an embodiment of the present invention, a block diagram of the convergence services session manager 86 of FIG. 3 is shown. The convergence services session manager 86 includes a translator 90, which is responsible for translating between SIP, LDAP, or other protocol and the convergence protocol. The convergence services session manager 86 also includes a session manager 92, which keeps track of all of the various sessions underway with all the mobile devices 42/43. The session manager 92 gets messages from the input/output adaptor 94, and determines which session they belong to. If necessary, the session manager 92 uses the translator 90 to translate the messages into the appropriate protocol (LDAP, SIP, proprietary), consults a policy manager 96 to see if any policies apply to the messages, then passes the translated messages on to either the SIP proxy user agent 80, the LDAP connector 78, or the proprietary connectors 84. The policy manager 96 uses policy data stored on database 97.

The session manager 92 can manage requests received from the input/output adaptor to create a SIP proxy user agent 80 or a B2BUA 82 using the mobility manager 98, and also consults the policy manager 96 for any applicable policy. The session manager 92 also uses the security agent 100 to encrypt/decrypt messages, check PINs and passwords and, if set by the administrator, administers a 'kill' command to a client. The kill command is used in the case where a cell phone is lost or stolen. By setting a special flag through the administration function, this security agent 100 can send an encrypted message to the intelligent client agent 58 of the mobile device in question and render the mobile phone unusable, and the data on it inaccessible.

The session manager 92 uses the session controller 102 to ensure that a data connection is maintained to all the active mobile devices. The session controller creates pinholes through the firewall and uses known keep-alive mechanisms to accomplish this.

Figure 5:
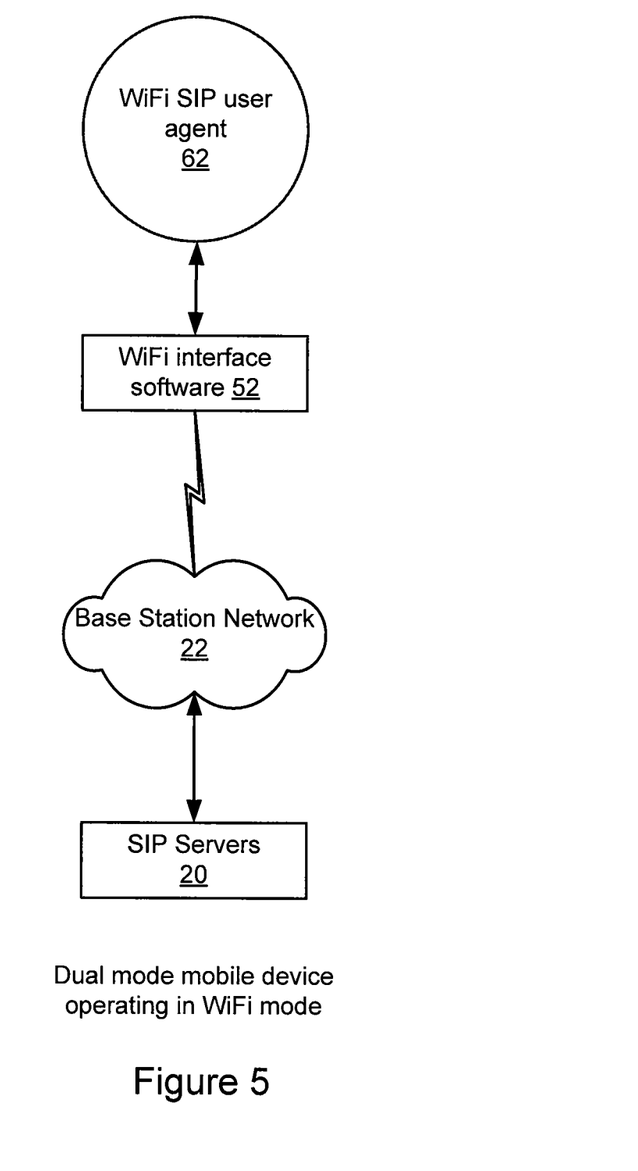
FIG. 5 is a block diagram showing how a dual mode mobile device communicates while in WiFi mode.
Figure 6:
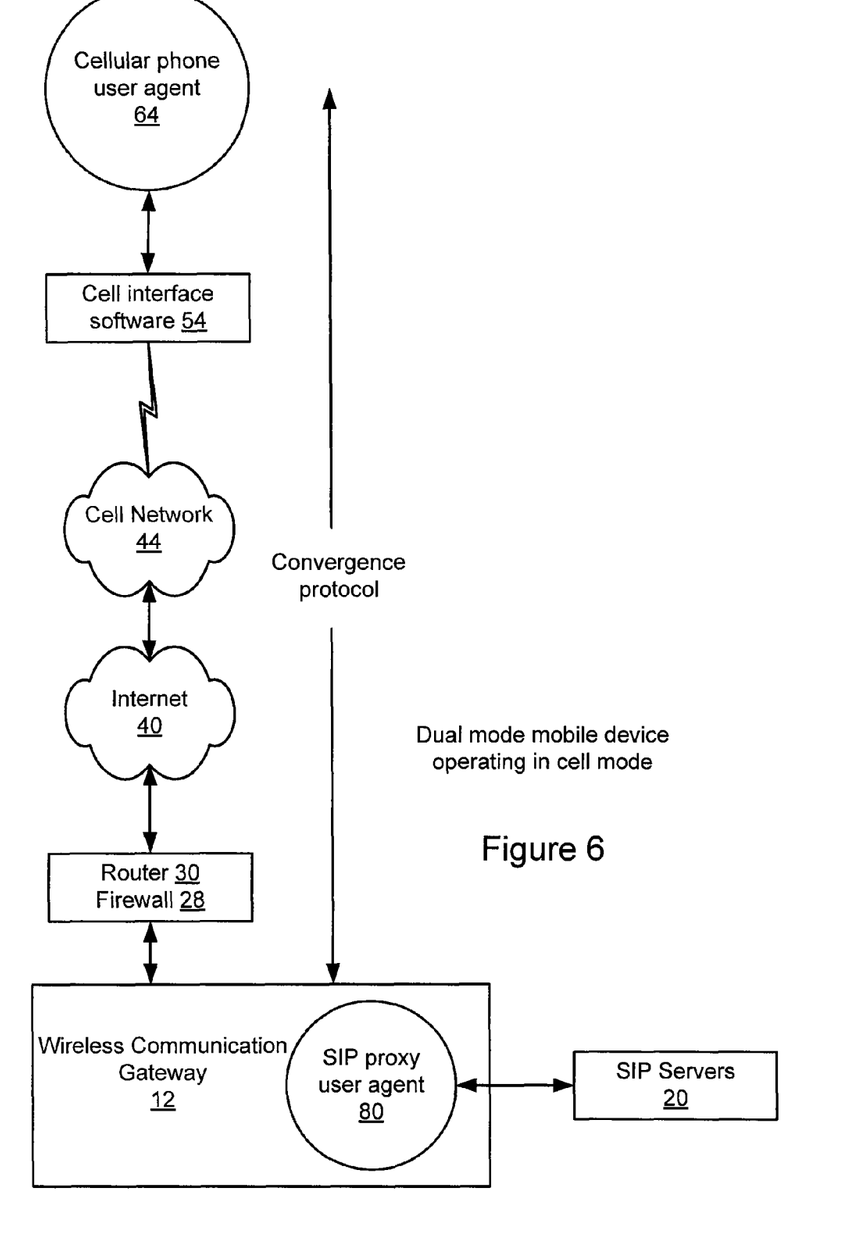
FIG. 6 is a block diagram showing how a dual mobile device operates in cell mode using a convergence protocol.

In operation, when the dual mode wireless device 42 is in WiFi mode and within WiFi range of the base station network 22, it has its own WiFi SIP user agent 62 that communicates directly with a SIP server 20, as shown in FIG. 5. When the mobile device 42 goes out of WiFi range, the intelligent client agent 58 determines this, and requests that the wireless communication gateway 12 act on behalf of the mobile device 42. The wireless communication gateway 12 does this by instantiating a SIP proxy user agent 80 that registers with the SIP server 20, and then uses the convergence protocol over the Internet 40 and the cell network 44, between the intelligent client agent 58, through the cell phone user agent 64, and the wireless communication gateway 12, to pass information, as shown in FIG. 6. The convergence protocol mimics the functionality that the normal WiFi connection has available, but does it in a way that addresses security, firewall and bandwidth issues that are inherent in cell networks.

Alternatively, a B2BUA 82 can be instantiated instead of a SIP proxy user agent 80. In this scenario, an application running on the dual mode mobile device 42 would detect when the WiFi signal from the base station network 22 is getting weak and would inform the intelligent server agent 76 of the situation through a convergence protocol. The intelligent server agent 76 would then start a second call to the cell side of the client using the B2BUA 82 while keeping the SIP call up. The client, i.e., the dual mode mobile device 42, would auto answer this new call and, upon the server receiving this answer, the intelligent server agent 76 would move the call from the WiFi side to the cell side and disconnect the WiFi call. In a reverse situation where the dual mode mobile device 42 detects the base station network 22 while there is a cell call up, the dual mode mobile device 42 would inform the intelligent server agent of this through a convergence protocol message. At this point, the intelligent server agent 76 would make a WIFi SIP call to the dual mode mobile device 42, which would auto answer the call. Upon the intelligent server agent 76 receiving the answer from the dual mode mobile device 42, it would swap the cell call to the WiFi call before dropping the cell call. This method could also be used to move the call from the mobile device to a desk phone. The convergence protocol message would be a move call and the second call would be to the desktop device.

The following describes in more detail an exemplary scenario of how the mobile device 42 changes from WiFi to cell mode. Referring to FIG. 2, the roaming agent 60 monitors the WiFi signal strength. When the roaming agent 60 determines that the WiFi signal from the base station network is no longer available or viable, it informs the convergence services agent 66, which communicates with the WiFi SIP user agent 62. The WiFi SIP user agent 62 then determines what to do with any existing sessions. The choices available include handing the call off to the cellular phone user agent 64. Upon doing this, the WiFi SIP user agent 62 communicates with the convergence services agent 66 to update the display 74 appropriately. The convergence services agent 66 then asks the WiFi SIP user agent 62 to shut down. Following this, the convergence services agent checks any policies with the policy manager 68, which could include policies on whether the user of the mobile device 42 is enabled for service continuity when the mobile device 42 is in cell mode. If the user in question is enabled to do so, the convergence services agent activates the cellular phone user agent 64. The cellular phone user agent 64 then tries to establish a connection with the wireless communications gateway 12. Once a connection has been established, the roaming agent 60 informs the convergence services agent of the connection.

Referring to FIGS. 3 and 4, the input/output adapter 94 informs the session manager 92 that the mobile device 42 wishes to establish a new connection. The session manager 92 passes the request to the mobility manager 98, which then checks with the policy manager 96 to see if system, user, and device level policies and user profiles allow this connection. If affirmative, the session manager 92 creates a new instance of a SIP proxy user agent 80, which registers with a SIP server 20. The SIP proxy user agent 80 also reestablishes all the subscriptions for presence information for the user's buddy list. If this is successful, then the session controller 102 is informed, so that it can keep a data connection alive between the wireless communication gateway 12 and the mobile device 42. Following this, the session manager 92 sends a message to the convergence service agent 66, through the input/output adapter 94, informing it of the success. Finally the convergence services agent 66 updates the display 74, informing the user of the successful change.

The following describes an exemplary scenario related to an incoming call to the mobile device 42 when the mobile device is in cell mode. When an incoming call is received from a caller 19 at the SIP server 20 for the user of the mobile device 42, SIP will broadcast this to all registered devices connected to the enterprise system 9. Referring to FIG. 3 and FIG. 4, the SIP proxy user agent 80 will receive this request and pass it to the session manager 92. The session manager 92 then uses the translator 90 to translate the message into the convergence protocol. Following this, the session manager 92 uses the input/output adapter 94 to send the message to the cellular phone user agent 64 on the mobile device 42.

Figure 7:
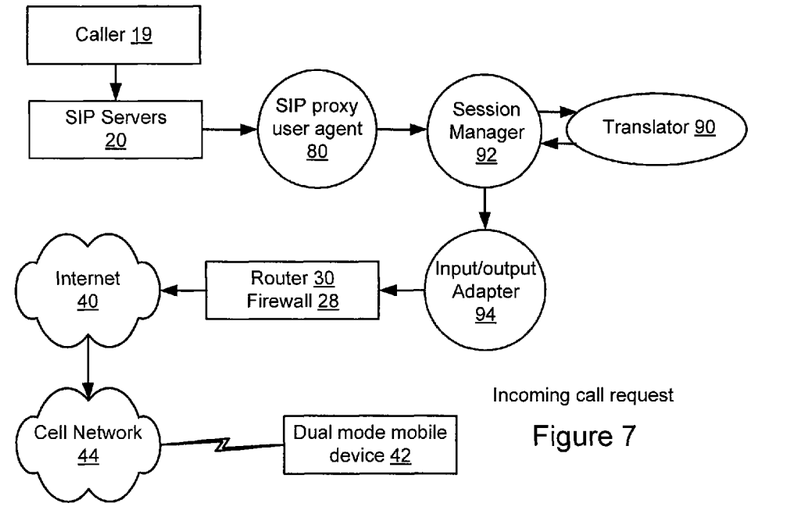
FIG. 7 is a block diagram showing an incoming call request being placed to a mobile device.

Referring to FIGS. 2 and 7, the cellular phone user agent 64 receives the request, and passes it to the convergence services agent 66, which displays the call to the user, with options and calling line ID. If the user selects the option to answer the call, then the convergence services agent 66 informs the cellular phone user agent 64, which sends a convergence protocol accept message through the cell interface software 54 back to the convergence services session manager 86. This message includes the phone number or SIP address of where to send the incoming call. The flow of the incoming call request between the SIP server 20 and the mobile device 42 is shown in FIG. 7, with the router and firewall omitted from the figure.

Figure 8:
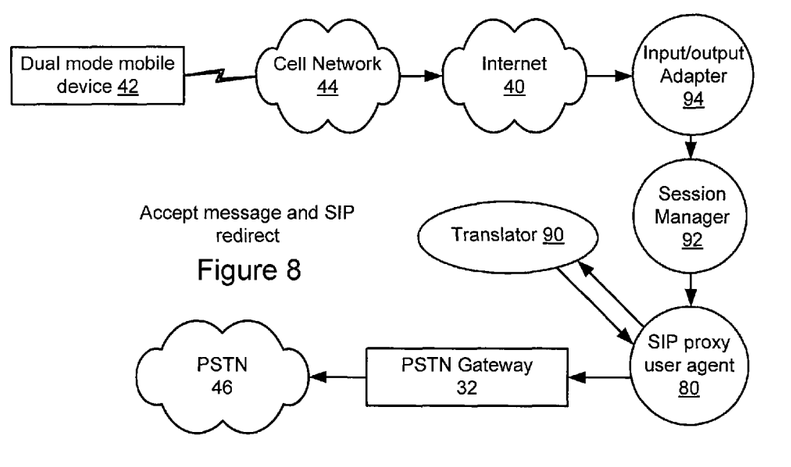
FIG. 8 is a block diagram showing how an accept message is sent from the mobile device of FIG. 7 to a SIP proxy agent.
Figure 9:
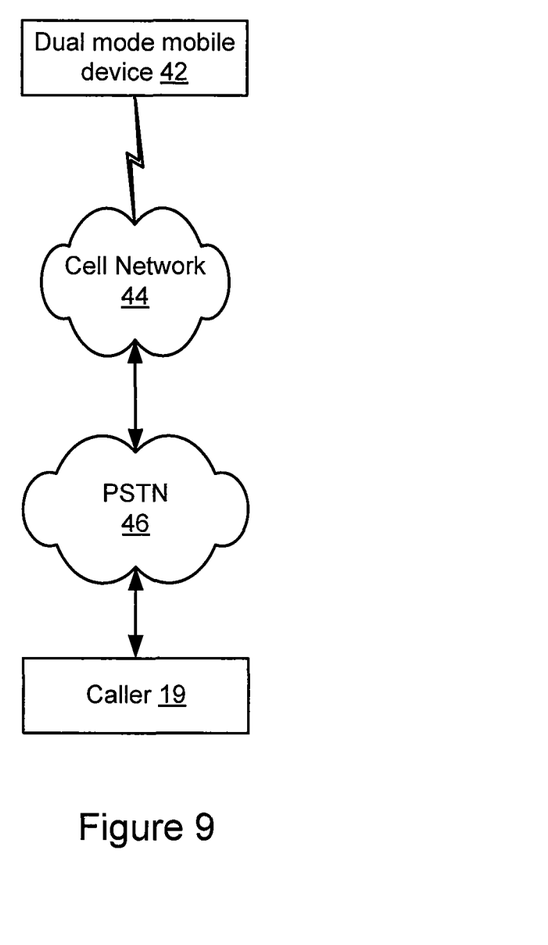
FIG. 9 is a block diagram showing the connection established subsequent the steps shown in FIGS. 7 and 8.

Referring to FIGS. 4 and 8, the accept message is received by the input/output adapter 94 and passed to the session manager 92 that figures out for which session the message is for and then uses the translator 90 to create a SIP redirect message, which is given to the SIP proxy user agent 80. The SIP proxy user agent 80 uses the SIP redirect mechanism to redirect the call through the PSTN gateway 32 to the number received in the accept message. The PSTN gateway 32 then communicates with the mobile device 42 through the PSTN 46 and the cell network 44. The flow of the accept message from the mobile device 42 to the input/output adapter 94, and the flow of the redirect message from the SIP proxy user agent to the PSTN gateway 32 are shown in FIG. 8. The established connection between the caller 19 and the mobile device 42 is shown in FIG. 9.

The following describes an exemplary scenario of how to access a buddy list with presence information and how a call in cell mode is accomplished. Referring to FIG. 4, when there are updates to presence information (e.g. a buddy list) in the presence server 26, the SIP proxy user agent 80 is informed, and in turn, it informs the session manager 92. The session manager uses the translator 90 to create an update buddy message in the convergence protocol and sends it to the convergence services agent 66 through the input/output adapter 94.

Referring to FIG. 2, the convergence services agent 66 receives the updated buddy message and saves the new presence information. When the user of the mobile device 42 accesses the buddy list on the display, the buddy information and the presence information are displayed. The user selects a buddy from the list and makes a call request. The request is given to the convergence services agent 66, which checks with the policy manager 66 to determine whether the call should go directly out on the cell network 44, or should go through the SIP server 20 so that it is presented and billed properly. If the call is to go through the SIP server 20, the convergence services agent 66 sends a convergence protocol invite message, including the buddy information, to the convergence services session manager 86 through the cell interface software 54.

Referring to FIG. 4, the input/output adaptor 94 receives the invite message and passes it to the session manger 92. The session manager 92 determines which session the message applies to and translates the message into SIP using the translator 90. The translated message is then passed to the SIP proxy user agent 80. The SIP proxy user agent 80 establishes a SIP call to the user of the mobile device 42 first, and then, the SIP proxy user agent 80 does a SIP invite to the selected buddy. Finally, the SIP proxy user agent 80 does a SIP refer to transfer the SIP call to the user of the mobile device 42, the SIP call in question established by the SIP proxy user agent 80, to the called party. Thus, once the call to the buddy has gone through, the SIP proxy user agent 80 and the wireless communication gateway 12 are no longer involved in the call.

In the simple call scenarios described above, once the call is established, the wireless communication gateway 12 is no longer involved. However, when in-call features such as hold, transfer, conference, swap, cancel and call waiting are desired, the wireless communication gateway 12 may continue to be active.

Most cell phones today are Class B, which means that they can be operated in General Packet Radio Service (GPRS) or in Global System for Mobile communication (GSM) service (voice, SMS), but using only one or the other at a given time. During GSM service (voice or SMS), GPRS service is suspended, and then resumed automatically after the GSM service has concluded. By contrast, dual mode mobile devices, such as Class A cell phones, can be connected to GPRS service and GSM service at the same time. In order to invoke in-call features, an indication must be sent to the wireless communication gateway 12. This can be accomplished through SMS messaging, but it can be very slow and thus result in non-real-time performance. As is described below, the in-call features can be made available in real-time by combining functionalities of the wireless communication gateway 12 and the media server 34.

To allow real-time in-call features to a dual mode mobile device operating in cell mode, the SIP proxy user agent 80 is not enough and a B2BUA 82, as shown in FIG. 3, is required. The B2BUA 82 registers at the PBX 14 on behalf of the mobile wireless device user(s), and acts as a SIP proxy agent to both ends of a SIP call. The B2BUA agent 82 is responsible for handling all SIP signaling between both ends of a call, from call establishment to termination. Each call is tracked from beginning to end, allowing the operators of the wireless communication gateway 12 to offer value-added in-call features. The wireless communication gateway 12 generally acts as a unified and integrated interface between the client device and the provider of the services or features. For example, conferencing functionality is generally provided by the media server 34. By extending this concept, all calls that want in-call features can be created as pseudo two-party conferences, with added functionality. In the case of a normal incoming or outgoing call, instead of using SIP Redirect or Refer functionality, two SIP calls are set up, both terminating on the B2BUA 82. When a Class A cellular telephone is used, both a voice and data channel can be available as separate sessions, and a relationship between the voice and data session is maintained by the intelligent client side and server side agents. This also applies to the case where there are two devices involved: one to handle the voice and the other to handle the data. When a user decides to make a call, he can specify the device on which he wishes the voice call to be established. If he chooses a different device than the one originating the request, he can choose to manage the voice call through a data channel to the originating device. For example, a personal digital assistant (PDA) could be used to set up a call and a SIP phone 36 could be the target voice device. Once the voice call is established, the PDA can be used to manage features for that voice call.

In the case where the wireless communication gateway 12 has a B2BUA 82, an exemplary scenario of an incoming call to a mobile device 42 operating in cell mode is as follows. The incoming call is broadcast to registered users, and the mobile device 42 accepts the call. Upon acceptance of the incoming call, the B2BUA 82 is invoked instead of the SIP proxy user agent 80. The B2BUA 82 answers the incoming call by using the SIP Accept command, and makes a new call to the mobile device 42 through the PSTN Gateway 32; the cellular phone user agent 64 automatically answers this latter call. Voice packets are then streamed through the wireless communication gateway 12 via the B2BUA 82. For an outgoing call the B2BUA 82 acts as the calling party for both calls, instead of the SIP proxy user agent 80, and stays in the middle.

Figure 10:
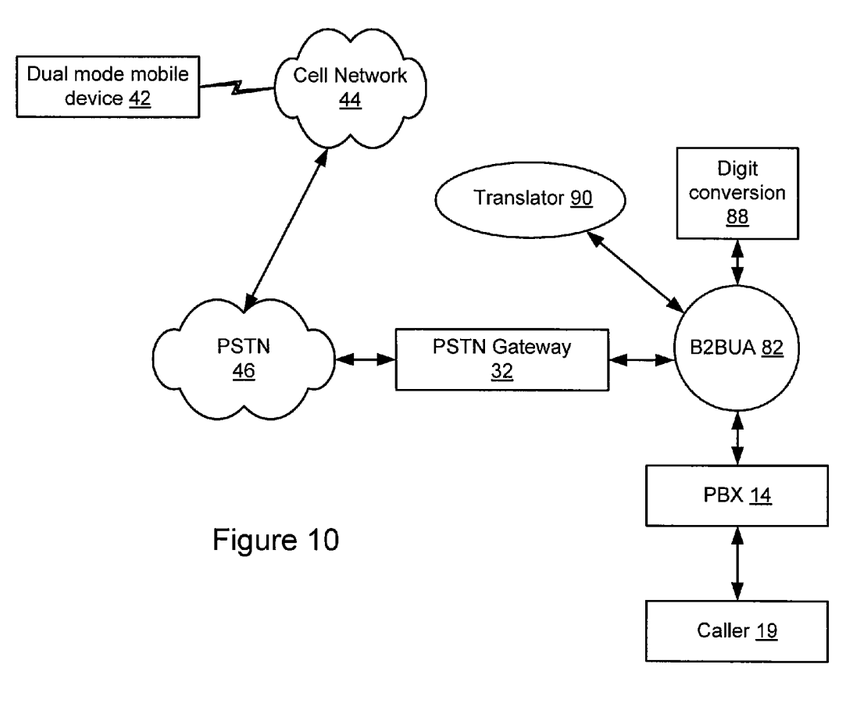
FIG. 10 shows a connection established through a back-to-back user agent.

Once the B2BUA 82 has control over both parts of the call, including the voice path, in-call features can be added. However, since there is no longer a data connection back to the wireless communication gateway, another signaling method must be used. Such a signaling method can, for example, use dual-tone multi-frequency (DTMF) signaling to invoke in-call features. When a user selects an in-call feature, the convergence services agent 66 can use pre-stored data to cause the cellular phone user agent 64 to out-pulse a particular DTMF stream. The PSTN gateway 32 can receive these DTMF digits and convert them into SIP DTMF messages, which are then sent to the B2BUA 82. The B2BUA 82 receives these DTMF messages, uses digit conversion 88 functionality provided by the media server 34 to convert the messages into corresponding functions, and then uses SIP equivalents to invoke the in-call feature on the PBX 14. FIG. 10 shows an established connection between a caller 19 and the mobile device 42, through the B2BUA 82. Although the B2BUA is shown connected to the PBX 14, it can also be connected to other components, such as, for example, the media server 34, shown in the LAN 10 of FIG. 1.

If a separate data channel is available, then instead of using DTMF signaling, a connection between the data call and the voice call, creating a 'super-session', can be made between the intelligent client agent 58 and the intelligent server agent 76. Messages to invoke in-call features can then be sent using the convergence protocol. When call waiting is offered to the B2BUA 82, the B2BUA can use a play function to provide a quick tone or message to the user of the mobile device 42 to let him know that a call is waiting. The message can be pre-recorded, or it can use text-to-speech functionality to sound the name of the person calling if there is calling line identification available. This can be achieved in two ways. Either a "conference" is created and the play function is injected into the call so that both parties can hear it, or the connection between the two parties is temporarily broken, and the sound is played and only heard by the mobile wireless device user.

Group calls can be set up in two ways. Either the list of members is set up previously and stored in the wireless communication gateway 12 and the user of the mobile device 42 selects this list, or the user creates a new list of people to make the call to. In the first case, the convergence services agent 66 conveys the conference request and the selected list, using the convergence protocol, to the convergence services session manager 86, which in turn retrieves the list of users from a database. In the second case, the convergence services agent 66 conveys the conference request and the list of users to the convergence services session manager 86, using the convergence protocol. Once the list of users has been determined, the convergence services session manager 86 provides the request to the media server 34, which then sets up the conference.

Added functionality can be put into the conference set up. For instance, the play function can be used to provide conference information to potential attendees, with or without Text-to-Speech. The user can choose to accept the conference through a DTMF response, which can trigger a call. The media server 34 makes the call to the conferee, and acts as the endpoint for the SIP call. A conferee can also have the option of delaying his entrance, and this can be announced into the conference via a play function to conferees. As members join, they can use DTMF to ask for a list of members in the conference, which again can be played to them. Members leaving the conference can also use this type of functionality.

A conference can also be created using mixed-mode. This typically requires separate voice and data channels. In this case, instant messaging and voice conferences can be set up at the same time, so that members can talk in the conference, but also have a list of conference members in a special instant messaging (IM) session. In this way, a member can choose to side-bar through text with one or more of the members. Instant messaging can be used to inform potential members of the conference, and who is setting it up. They can choose to accept or not, and the typed response can trigger the voice call. The media server 34 makes a voice call to the conferee, and acts as the endpoint for the SIP call. The conferee can also use IM to delay his entrance to the conference, which can be sent to the members via and IM. Members leaving would have their status updated in the IM window. The advantage to this functionality is that the conference is not inundated with messages as people come and go; and, as people join, they are given an immediate view of who is in the conference, who is going to be in the conference, and who has not accepted. This avoids the need to announce new members via voice every time someone joins.

Although the above embodiments describe how a dual mode mobile device 42 wandering out of WiFi range of the base station network 22 can maintain SIP-enabled call functionality through a cell network 44 through the use of intelligent agents, a worker having ordinary skill in the art will understand that such SIP-enabled call functionality can also be provided to a single mode mobile device (for example mobile device 43 shown in FIG. 1). In this case, the complexity of the intelligent client agent 58 shown for mobile device 42 in FIG. 2 would be reduced, since the WiFi SIP user agent 62 and the roaming agent 60 would no longer be required. Further, a worker having ordinary skill in the art will understand that maintaining SIP-enabled call functionality of the mobile device 42 is also possible when the mobile device 42 has access to a WiFi network other than the base station network 22, provided that the other WiFi network is connected to the Internet 40.

In the preceding description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A wireless communication gateway for a Session Initiation Protocol (SIP) enterprise system, the wireless communication gateway comprising:
   at least one processor; and
   a memory operatively coupled to the at least one processor, the memory storing instructions that when executed by the at least one processor provide an intelligent server agent having:
      an input/output adapter for communicating with an intelligent client agent in a mobile device over a cellular network using HTML-based messages, the input/output adapter to receive, from the intelligent client agent of the mobile device, over the cellular network, a request for a cellular connection, the request for the cellular connection being made using an HTML-based message, the cellular connection to support a call between the mobile device and the SIP enterprise system;
      a session manager connected to the input/output adapter, the session manager to obtain the request for the cellular connection from the input/output adapter;
      a mobility manager connected to the session manager, the session manager to pass the request for the cellular connection to the mobility manager, the mobility manager for instantiating a back to back user agent (B2BUA) in response to the request for the cellular connection, the B2BUA to register at a private branch exchange (PBX) associated with the enterprise system, the PBX having associated thereto in-call features, the B2BUA to track the call from the beginning of the call to the end of the call, the B2BUA to enable, in real-time, at least one of the in-call features during the call, the at least one of the in-call features being invoked at the PBX by the mobile device through B2BUA or by a calling device comprised within the enterprise system.

2. The gateway of claim 1, wherein the B2BUA includes means to communicate with components of the SIP enterprise system using the SIP, and wherein the session manager includes means to manage communications between the mobile device and the B2BUA.

3. The gateway of claim 2, wherein the components of the enterprise system include a directory services server, the gateway further comprising a lightweight directory access protocol (LDAP) connector connected to the session manager, the LDAP connector for communicating with the directory services server using a LDAP.

4. The gateway of claim 1, wherein the intelligent server agent further comprises:
   a translator for translating the HTML-based messages into messages understandable by the components of the enterprise system, and vice versa.

5. The gateway of claim 1, further comprising at least one of a policy manager connected to the session manager, the policy manager for managing access policies related to the mobile device, a session controller connected to the session manager, the session controller for maintaining a connection between the mobile device and the wireless communication gateway, and a security agent connected to the session manager, the security agent for doing at least one of encrypting/decrypting messages passed between the mobile device and the enterprise system and verifying personal identification numbers and passwords sent from the mobile device.

6. The gateway of claim 1 wherein the in-call features include at least one of hold, transfer, conference, swap, cancel and call waiting.

7. A method of establishing communication between a caller using a Session Initiation Protocol (SIP) and a mobile device operating over a cellular network, the method comprising steps of:
receiving, from the caller, a SIP call request for the mobile device at a back to back user agent (B2BUA) instantiated on a wireless communication gateway;
translating, at the wireless communication gateway, the SIP call request into an HTML-based call request;
sending the HTML-based call request from the wireless communication gateway to the mobile device over the Internet and the cellular network;
receiving, at the wireless communication gateway, an HTML-based accept call message transmitted by the mobile device over the Internet and the cellular network, in reply to the HTML-based call request;
translating, at the wireless communication gateway, the HTML-based accept call message into a SIP accept call message;
establishing, at the wireless communication gateway, a telephone call, through the B2BUA, between the caller and the mobile device using the SIP over a public switched telephone network (PSTN) gateway, a PSTN, and the cellular network, the B2BUA to track the telephone call from the beginning of the telephone call to the end of the telephone call, the B2BUA being connected to a private branch exchange (PBX), the PBX having associated thereto in-call features;
receiving, during the call, at the B2BUA, from the mobile device, a dual-tone multi-frequency (DTMF) signal associated with a selected in-call feature, the selected in-call feature being one of the in-call features; and
invoking, during the call, in real-time, at the PBX, the selected in-call feature.

8. The method of claim 7 wherein the in-call features include at least one of hold, transfer, conference, swap, cancel and call waiting.

9. A method for maintaining Session Initiation Protocol (SIP) communication between a mobile device and a wireless communication gateway of an enterprise system, the SIP communication enabled by a WiFi signal, the wireless communication gateway connected to a public switched telephone network (PSTN), the method comprising steps of:
at the mobile device,
detecting a weakening of the WiFi signal during a WiFi SIP call between the mobile device and the wireless communication gateway over a WiFi network; and
sending a HTML-based message to the wireless communication gateway, the HTML-based message indicating the weakening of the WiFi signal;
at the wireless communication gateway,
in response to receipt of the HTML-based message from the mobile device, instantiating a back to back user agent (B2BUA); and
starting a second SIP call to the mobile device over the PSTN and a cellular network using the B2BUA during the WiFi SIP call;
at the mobile device,
receiving the second SIP call over the PSTN and the cellular network; and
answering the second SIP call during the WiFi SIP call to maintain SIP communication between the mobile device and the wireless communication gateway, the B2BUA to track the second SIP call from the beginning of the second SIP call to the end of the second SIP call, the B2BUA being connected to a private branch exchange (PBX), the PBX having associated thereto in-call features;
at the B2BUA,
receiving, during the second SIP call, at the B2BUA, from the mobile device, a dual-tone multi-frequency (DTMF) signal associated with a selected in-call feature, the selected in-call feature being one of the in-call features; and
invoking, during the call, in real-time, at the PBX, the selected in-call feature in accordance with the DTMF signal.

10. The method of claim 9 further comprising, at the wireless communication gateway, disabling the WiFi SIP call over the WiFi network.

11. A method for maintaining Session Initiation Protocol (SIP) communication between a mobile device and a party connected to an enterprise system, the enterprise system having a wireless communication gateway, the method comprising steps of:
at the mobile device,
detecting a weakening of a cell signal during a SIP call over a cell network, the SIP call being between the mobile device and the party connected to the enterprise system, the wireless communication gateway having a back-to-back user agent (B2BUA), the B2BUA to track the SIP call from the beginning of the SIP call to the end of the SIP call, the B2BUA being connected to a private branch exchange (PBX), the PBX having associated thereto in-call features, the B2BUA to receive, during the SIP call, from the mobile device, a dual-tone multi-frequency (DTMF) signal associated with a selected in-call feature, the selected in-call feature being one of the in-call features, the B2BUA to invoke, during the SIP call, in real-time, at the PBX, the selected in-call feature in accordance with the DTMF signal;
and
sending a HTML-based message to the wireless communication gateway, the HTML-based message indicating the weakening of the cell signal, the enterprise system having a WiFi network base station operationally connected to the wireless communication gateway, the WiFi network base station being associated with a WiFi network that is within range of the mobile device;
at the wireless communication gateway,
in response to receipt of the HTML-based message from the mobile device, signaling the WiFi network base station to start a WiFi SIP call to the mobile device through the WiFi network; and
at the mobile device,
receiving the WiFi SIP call; and
answering the WiFi SIP call during the SIP call, over the cell network, to maintain SIP communication between the mobile device and the party connected to the enterprise system, the WiFi network base station being operationally connected to the PBX, the in-call features to be invoked by the mobile device, at the PBX, through the WiFi network.

12. The method of claim 11 further comprising, at the wireless communication gateway, disabling the SIP call over the cell signal.

* * * * *